3,842,093
CHROMAN-3-OLS

John Richard Collier, Birmingham, and Alan Sidney Porter, Halesowen, England, assignors to Albright & Wilson Limited, London, England
No Drawing. Filed June 16, 1972, Ser. No. 263,425
Int. Cl. C07d 7/24
U.S. Cl. 260—345.2          20 Claims

ABSTRACT OF THE DISCLOSURE

Chroman-3-ol and its aromatic nucleus-substituted derivatives are prepared by contacting phenyl allyl ether or a nuclear substituted derivative thereof with an aqueous acidic solution containing thallium III ions whereby the allyl ether is oxidized and the thallium III ion is reduced to a thallium I ion.

---

The present invention relates to a cyclisation process to produce chroman-3-ol (i.e. 3-hydroxy-2,3-dihydrobenzopyran) and its derivatives.

Methods of making such compounds have previously been suggested in Bull. Chim. Soc. de France, 1968, 4203 and in J. Org. Chem., 1970, 35, 2282. The former suggestion is a multi-stage process starting from chroman-4-ol (itself obtainable by reduction of the product of a Claisen reaction from 2-methoxyacetophenone and a formate) and proceeding via-chrom-3-ene chroman-3,4-diol, and chroman-3-one. The latter sugestion involves hydroboration and oxidation reaction and, although low yields of chroman-3-ol are obtainable using coumarin as the starting material, satisfactory yields are only obtainable if chromone, i.e. benzo-4-pyrone, is employed as the starting material. This starting material itself can be synthesized by a Claisen reaction of 2-methoxy acetophenone and a formate.

It is known that phenyl allyl ester will undergo a Claisen rearrangement to produce ortho allyl phenol. It has further been suggested to oxidise organic compounds using thallium III compounds as oxidants.

We have now found that we can obtain satisfactory yields of chroman-3-ol or its derivatives by reaction of phenyl allyl ether, or substituted derivatives there of with a thallium III compound. Accordingly this process constitutes our invention. Suitable derivatives of phenyl-allyl ether for use in the process of the present invention are those in which at least one and preferably two positions in the aromatic nucleus ortho to the ether linkage are unsubstituted and do not have a sterically hindering group as the substituent adjacent to it. It is also necessary that any substituents groups do not cause degradation and/or polymerization of the molecule under the reaction conditions and do not act as electron withdrawing groups to the positions ortho to the ether linkage in the aromatic nucleus. So long as these conditions are fulfilled any substituent groups can be attached to the aromatic nucleus. For example alkyl such as methyl alkoxy such as methoxy, halogeno, such as bromo, phenyl, phenoxy, benzyl, benzyloxy, acetyl and acetoxy groups may all be substituents in the aromatic nucleus; preferably such groups are para to the allyl ether group. Such compounds as these so long as they contain the essential

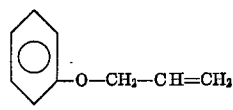

grouping will be regarded herein as being derivatives of phenyl allyl ether.

Normally an excess of thallium (III) compound will be employed to carry out the oxidation. Any convenient thallium salt may be employed so long as it is reasonably soluble in the reaction mixture. Compounds which are particularly suitable are the sulphates, nitrates, fluoroborates, perchlorates and trifluoroacetates. Normally such salts are employed in the presence of the corresponding acid, the reaction frequently being carried out in an aqueous medium although other media such as ethanol can be employed if desired. Since the thallium compound is reduced to the thallium (I) state at the end of the reaction it needs to be reoxidised for further use. This is normally accomplished electrolytically. In order to attain maximum efficiency from such a process it is not normally desirable to carry out this reoxidation to completion. Thus the reactant actually employed to carry out the oxidation reaction of the invention is normally a mixture of thallium III and thallium I compounds. It is convenient to use thallium III concentrations between 75% and 90% of the total thallium ions present but 50–100% may be used if desired.

The oxidation reaction according to the invention may be carried out at any convenient temperature. We have found, however, that reactions at room temperature are too slow to be particularly useful and that temperatures in the vicinity of those required for reflux are too vigorous to result in a satisfactory product. Thus we prefer to carry out the reaction at a temperature between 50 and 70° C., optimally about 60° C.

Compounds obtained by the process of the invention may be further reacted to form compounds analogous to various natural products. The compounds obtained will find use as edible colouring matter for use in the food industry. Short chain esters of the compounds may be used in perfumery and certain substituted derivatives, in particular those having methyl, methoxy and hydroxy groups attached to the aromatic ring in pharmacy. The acetate ester and methyl ethers of chroman-3-ol may be prepared by normal preparative techniques. Nitration gives 6 nitro chroman-3-ol, chlorination 6,8 dichloro chroman-3-ol and bromination 6 bromo chroman-3-ol.

Certain of the compounds formed by the process of the invention are believed to be novel and accordingly constitute further aspects of our invention. Typical of these are 6 methyl chroman-3-ol and 6 methoxy chroman-3-ol.

The process of the invention is illustrated by the following examples:

EXAMPLE 1

Allyl phenyl ether (4.53 g., 0.034 mole) was stirred under reflux for 45 minutes with 150 ml. of an aqueous solution containing initially (per litre):

48.5 g. (0.237 g. atoms) thallium (III)

6.00 g. (0.029 g. atoms) thallium (I)

206 g. (2.1 moles) sulphuric acid.

At the end of this time all the thallium (III) had been reduced to thallium (I).

The solution was then extracted twice with 50 ml. portions of diethyl ether. The extract was dried and the ether was evaporated. The brown oil which remained was extracted with hot hexane and evaporation of this solvent left in residue of 3.65 g. chroman-3-ol (72% of the amount expected theoretically). Recrystallisation from hot hexane gave white crystals melting at 78° C.

The compound was identified by infra-red and nuclear magnetic resonance spectroscopy.

Analysis. Found: 71.68% carbon; 6.65% hydrogen.
Theory ($C_9H_{10}O_2$): 71.98% carbon; 6.71% hydrogen.

EXAMPLE 2

Allyl p-tolyl ether (9.028 g., 0.061 mole) was stirred at 40° C. for 1.25 hr. with 250 ml. of an aqueous solution containing initially (per litre):

49.9 g. (0.244 g. atoms) thallium (III)
245 g. (2.5 moles) sulphuric acid.

At the end of this time all the thallium (III) had been converted to thallium (I).

The solution was extracted twice with 50 ml. portions of diethyl ether. The extract was dried and the ether evaporated. The brown oil obtained was distilled under reduced pressure to give (i) starting material, (ii) a white solid which was recrystallised from hot hexane to give 6-methyl chroman-3-ol, M.p. 52°.

The compound was identified by infra-red and nuclear magnetic resonance spectroscopy.

EXAMPLE 3

Allyl p-methoxyphenyl ether (4.01 g., 0.0244 mole) was stirred at 40° C. for 1 hr. with 100 ml. of an aqueous solution containing initially (per litre):

49.9 g. (0.244 g. atoms) thallium (III)
245 g. (2.5 moles) sulphuric acid.

At the end of this time all the thallium (III) had been converted to thallium (I).

The work-up procedure was as described for Example 1. Infra-red and N.M.R. spectroscopy of the crude material showed the presence of 6-methoxychroman-3-ol in about 20% yield.

We claim:

1. A process for the production of chroman-3-ol compounds comprising oxidizing an allyl ether of the formula

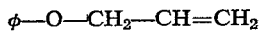
$\phi$—O—CH$_2$—CH=CH$_2$ wherein $\phi$ is phenyl substituted with at least one substituent selected from the group consisting of methyl, and methoxy, groups, at least one position ortho to the

—OCH$_2$CH=CH$_2$ group being unsubstituted; by contacting said allyl ether with a thallium III salt in an aqueous solution containing an acid selected from the group consisting of sulphuric, nitric, fluoroboric, perchloric and trifluoroacetic acids.

2. A process according to claim 1 wherein said allyl ether is phenyl allyl ether.

3. A process according to claim 1 wherein said allyl ether is phenyl allyl ether containing a methyl, methoxy, or bromo substituent in the para position.

4. A process according to claim 1 which is carried out at from 50–70° C.

5. The process of claim 1 wherein said aqueous solution is an aqueous sulphuric acid containing an excess of thallium (III) sulphate and is at a temperature of from 50–70° C.

6. The process of claim 1 wherein said aqueous acidic solution is an aqueous sulphuric acid containing an excess of thallium (III) sulphate and is at a temperature of from 50–70° C.

7. The process of claim 1 wherein said $\phi$ is phenyl substituted with at least one methyl group.

8. The process of claim 7 wherein both positions ortho to the —OCH$_2$CH=CH$_2$ group are unsubstituted.

9. The process of claim 1 wherein said $\phi$ is p-methylphenyl.

10. The process of claim 9 wherein said aqueous acidic solution is an aqueous sulpruric acid containing an excess of thallium (III) sulphate and is at a temperature of from 50–70° C.

11. The process of claim 1 wherein said $\phi$ is phenyl substituted with at least one methoxy group.

12. The process of claim 11 wherein both positions ortho to the —OCH$_2$CH=CH$_2$ group are unsubstituted.

13. The process of claim 1 wherein said $\phi$ is p-methoxyphenyl.

14. The process of claim 13 wherein said aqueous solution is an aqueous sulphuric acid containing an excess of thallium (III) sulphate and is at a temperature of from 50–70° C.

15. The process of claim 1 wherein said aqueous acidic solution also contains some thallium (I) ions.

16. A process for the production of chroman-3-ol compounds comprising oxidizing an allyl ether of the formula

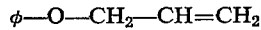
$\phi$—O—CH$_2$—CH=CH$_2$ wherein $\phi$ is (i) phenyl; or (ii) phenyl substituted with one substituent selected from the group consisting of alkyl, alkoxy, halogens, phenyl, phenoxy, benzyl, benzyloxy, acetyl, and acetoxy groups; by contacting said allyl ether with a thallium III salt in an aqueous solution containing an acid selected from the group consisting of sulphuric, nitric, fluorobroic, perchloric and trifluoroacetic acids.

17. The process of claim 16 wherein said phenyl group is substituted only at the para position.

18. The process of claim 17 wherein said aqueous acidic solution is an aqueous sulphuric acid containing an excess of thallium (III) sulphate and is at a temperature of from 50–70° C.

19. 6 methyl chroman-3-ol.

20. 6 methoxy chroman-3-ol.

References Cited

Baranton et al.: *Bull. Chem. Soc. de France* (1968), pp. 4203–8.

Still et al.: *J. Org. Chem.*, vol. 35, pp. 2282–6 (1970).

JOHN M. FORD, Primary Examiner

U.S. Cl. X.R.

252—522; 260—345.5, 999

UNITED STATES PATENT OFFICE
CERTIFICATE OF CORRECTION

Patent No. 3,842,093  Dated October 15, 1974

Inventor(s) John Richard COLLIER and Alan Sidney PORTER

It is certified that error appears in the above-identified patent and that said Letters Patent are hereby corrected as shown below:

Column 3, line 47, replace "1" with --16--.

Column 3, line 49, replace "1" with --16--.

Column 4, line 1, replace "1" with --2--.

Column 4, line 11, correct the spelling of "sulphuric".

Column 4, line 25, replace "1" with --16--.

Column 4, line 37, correct the spelling of "fluoroboric".

Signed and sealed this 24th day of December 1974.

(SEAL)
Attest:

McCOY M. GIBSON JR.          C. MARSHALL DANN
Attesting Officer            Commissioner of Patents